United States Patent
Coffin, III

(10) Patent No.: US 7,634,171 B2
(45) Date of Patent: Dec. 15, 2009

(54) PC-BASED PERSONAL VIDEO RECORDER

(75) Inventor: Louis F. Coffin, III, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1041 days.

(21) Appl. No.: 10/151,676

(22) Filed: May 20, 2002

(65) Prior Publication Data

US 2003/0215211 A1 Nov. 20, 2003

(51) Int. Cl.
- H04N 7/08 (2006.01)
- G06F 11/30 (2006.01)
- G06F 12/14 (2006.01)
- H04N 7/167 (2006.01)
- H04L 9/00 (2006.01)

(52) U.S. Cl. .................. 386/94; 713/190; 380/217; 380/277

(58) Field of Classification Search ................ 725/151, 725/153, 147; 370/535, 516, 537; 386/94; 713/190; 380/217, 277
See application file for complete search history.

(56) References Cited

U.S. PATENT DOCUMENTS

| | | | |
|---|---|---|---|
| 5,790,668 A * | 8/1998 | Tomko | 713/186 |
| 5,790,958 A * | 8/1998 | McCoy et al. | 455/557 |
| 6,069,956 A * | 5/2000 | Kurihara | 380/212 |
| 6,111,896 A * | 8/2000 | Slattery et al. | 370/535 |
| 6,272,637 B1 * | 8/2001 | Little et al. | 713/194 |
| 6,788,604 B2 * | 9/2004 | Yokota et al. | 365/218 |
| 6,853,728 B1 * | 2/2005 | Kahn et al. | 380/239 |
| 7,028,082 B1 * | 4/2006 | Rosenberg et al. | 709/223 |
| 2002/0054068 A1 * | 5/2002 | Ellis et al. | 345/716 |
| 2003/0106072 A1 * | 6/2003 | Soundararajan | 725/151 |

* cited by examiner

Primary Examiner—Thai Tran
Assistant Examiner—Hung Q Dang
(74) Attorney, Agent, or Firm—Lee & Hayes, PLLC

(57) ABSTRACT

A PC-based personal video recorder (PVR) system enables recordation of video content on a general-purpose computer in a way that the computer is unable to perceptively display the recorded content, but is able to playback and distribute the content to a decoder box (e.g., set-top box) for display on a television. In one implementation, the general-purpose computer is equipped with a personal video recorder (PVR) card having a video tuner, a network connection, and scrambling capabilities. The PVR card is configured to receive video content and produce compressed digital video. The card scrambles the video content and stores it in the computer's memory. The scrambled video content is in a form that cannot be perceptibly displayed by the computer. During playback, the PVR card retrieves the scrambled video content from the memory, descrambles it, and outputs the video content to the decoder box for playback on the television.

8 Claims, 5 Drawing Sheets

PC-BASED PERSONAL VIDEO RECORDER

TECHNICAL FIELD

This invention relates to architectures for digital video recorders.

BACKGROUND

Video recorders have long been a mainstay of home entertainment. Videocassette recorders were first to reach wide adoption. Consumers grew accustomed to recording programs on videocassette tapes, which could be played at later time, recorded over, or archived for permanent retention. More recently, digital video recorders (or DVRs) with hard disk memories have grown in popularity. Due to the size of memory, viewers are able to record many programs. DVRs also offer new functionality, such as the ability to pause a currently-broadcast program and allow the viewer to watch the program, while still in progress, from the point it was paused. The DVR plays back the content from disk memory, starting at the pause event, while continuing to record the currently-broadcast content in the disk memory.

Notwithstanding their popularity, one hurdle for a more widespread adoption of DVRs is the price point. With current market conditions, DVRs are still considered expensive for some consumers. Such consumers may have already stretched their budget for home entertainment devices, owning such items as a television, a videocassette recorder, a cable box and/or satellite dish, a personal computer, a stereo, a game console, and the like. Adding another recording device may not be financially practical.

Accordingly, there is a need for lower-cost solution for home entertainment video recorders.

SUMMARY

A PC-based personal video recorder (PVR) system enables recordation of video content on a general-purpose computer in a way that the computer is unable to perceptively display the recorded content, but is able to playback and distribute the content to a decoder box (e.g., set-top box) for display on a television. This system offers a low cost solution for video recorders by modifying the consumer's existing general-purpose computer with the functionality to operate as a personal video recorder.

In the described implementation, the PVR system includes a general-purpose computer equipped with a personal video recorder (PVR) card, a network, and a decoder box. The PVR card has a video tuner, a network connection, and scrambling capabilities. The PVR card is configured to receive video content from a source (e.g., digital satellite broadcast, regional broadcast, cable headend) and produce compressed digital video. The card then scrambles the video content and stores the scrambled video content in the computer's memory. The scrambled video content is in a form that cannot be perceptibly displayed by the computer.

A software application executing on the computer performs disk transfers at the request of the PVR card and receives requests from the decoder box for recordation and playback of the video content. The viewer can thereby control the PVR system using either the computer or the decoder box. During playback, the PVR card retrieves the scrambled video content from the memory, descrambles it, and outputs the video content over the network to the decoder box for playback on a display. In this manner, the general-purpose computer is used as a storage device for digital video content. However, because the content is stored in scrambled form that prevents the computer from perceptively displaying it, the system protects content from being played and/or distributed in violation of the rights of the content owners.

DETAILED DESCRIPTION

The following discussion is directed to a PC-based personal video recorder system that employs a general-purpose computer as a personal video recorder (PVR). The PVR system stores video content on the general-purpose computer in a way that the computer is unable to view the recorded content, but facilitates playback of the content on a display (e.g., television). The general-purpose computer is modified to be able to tune to video channels, scramble the video content, and store the scrambled content in memory so that the computer cannot decipher it. The general-purpose computer is further able to playback the content by retrieving the scrambled content from memory, descrambling it, and presenting the video content on a display.

The system is described in the context of recording video content received over a broadcast network or an interactive network. Representative video content includes such things as movies, television shows, commercials, live events, newscasts, and so on. While the system is described as a video recorder system, it can be used as a personal recorder to record other forms of content, streaming or otherwise, such as audio content, images, and so on.

Exemplary Environment

Figure 1:
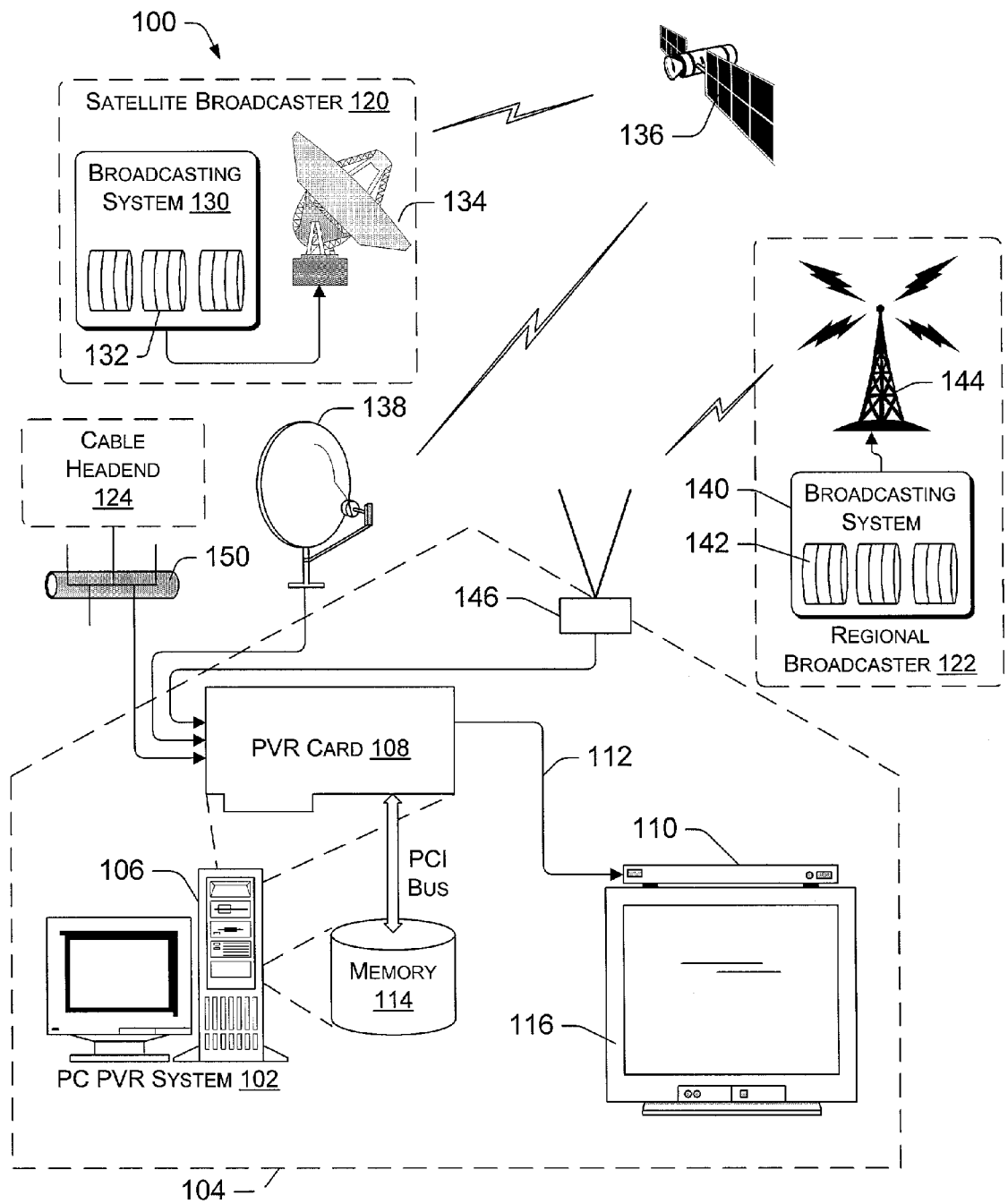
FIG. 1 illustrates a PC-based personal video recorder system in the context of receiving content from different sources, such as cable, satellite or other terrestrial sources.

FIG. 1 shows an exemplary environment 100 in which a PC-based personal video recorder system 102 can be implemented. PVR system 102 is illustrated as residing in a viewer's home 104. The system 102 includes a general-purpose computer 106 equipped with a PVR card 108, a set-top box 110 (or other type of decoder unit) and a network 112 interconnecting the computer 106 and set-top box 110. The network 112 may be implemented as a dedicated cable, as part of a local area network (LAN), or as part of a specialized home entertainment network.

The PVR card 108 installed in computer 106 is capable of receiving video content (e.g., movies, television shows, live events, commercials, newscasts, etc.) from one or more different sources. The PVR card 108 securely stores the video content in the computer's memory 114 in a way that prevents the computer 106 from extracting and perceptively displaying the content. The PVR card 108 is also capable of retrieving the stored content from the memory 114 and outputting the stored content to the set-top box 110 for display on a television 116. The adapted computer is therefore capable of operating as a personal video recorder that stores and plays back video content in the manner akin to a video cassette recorder or digital video recorder. Since the computer stores the content in a manner that prevents its own access and display of the content, the PVR system 102 can be said to be a "blind" PVR system.

The computer 106 is otherwise capable of performing common computing functions, such as email, calendaring, task organization, word processing, Web browsing, and so on. It runs an open platform operating system, such as the Windows® brand operating systems from Microsoft. It may be a standalone computer, or networked to other computers in the house, or additionally connected to the Internet via a modem, a cable modem, or other device. It may be implemented as a desktop computer, a server computer, a laptop computer, or other form of personal computer. One exemplary implementation of the computer 106 is described in more detail with reference to FIG. 5.

As illustrated in FIG. 1, the PVR system 102 is capable of receiving analog or digital video content from one or more sources including, for example, a digital satellite broadcaster 120, a regional broadcaster 122 (e.g., RF, microwave, etc.), and a cable network operator 124. Satellite broadcaster 120 has a broadcasting system 130 to package video content originating from a live feed or storage disks 132 into digital packets. The broadcaster 120 transmits the packets over a satellite network having an uplink transmitter 134 and an orbiting satellite 136. A satellite receiver or dish 138 resides at the viewer's home 104 to receive the satellite broadcast.

Regional broadcaster 122 has a broadcasting system 140 that creates a transmittable stream of video content from a live feed or storage disks 142. The broadcasting system 140 broadcasts the content over a wireless network from a transmitter 144 to a receiving antenna 146 within range of the signal. The content may be transmitted in digital or analog form.

The cable network operator 122 is configured to transmit video content in digital or analog format over a cable distribution network 150 to the viewer's residence 104. The cable network 150 may be implemented primarily as a broadcast network, or it may be implemented to support interactivity. In addition to those shown, other sources of content may be used including, for example, content streamed or otherwise served over the Internet.

The PVR card 108 is configured with an input to receive digital video content (e.g., from cable 122 or the satellite receiver 138) and/or analog video content (e.g., from antenna 146). The video content received from the various networks may be encoded in a format that is typically decoded by the set-top box 110. The PVR card 108 further encodes the content using scrambling or cryptographic techniques to blindly place the content onto the PC memory 114 over the PCI bus. The PVR card 108 may further store data associated with the video content, such as a playlist of programs stored in the computer memory 114 and/or data for an electronic program guide that contains upcoming programming. The computer 106 executes a software application that performs the actual disk transfers at the request of the PVR card 108.

The PVR system 102 can be controlled by the viewer via commands entered using the set-top box 110 or the computer 106. In the first instance, the set-top box resides proximally to the television 116 and accepts remote control commands from the viewer. These commands are forwarded to the PVR card 108 via the network 112. In the second instance, the viewer can enter instructions using a keyboard, mouse, or other input device for the computer 106.

The viewer can request recordation of certain programs and playback of recorded programs. When playback is requested, the PVR card 108 retrieves the video content and restores the content to the original encoded format as received from the networks. The recovered video content is then passed over the network 112 to the set-top box 110 for display on television 114.

Exemplary PC-Based PVR System

Figure 2:
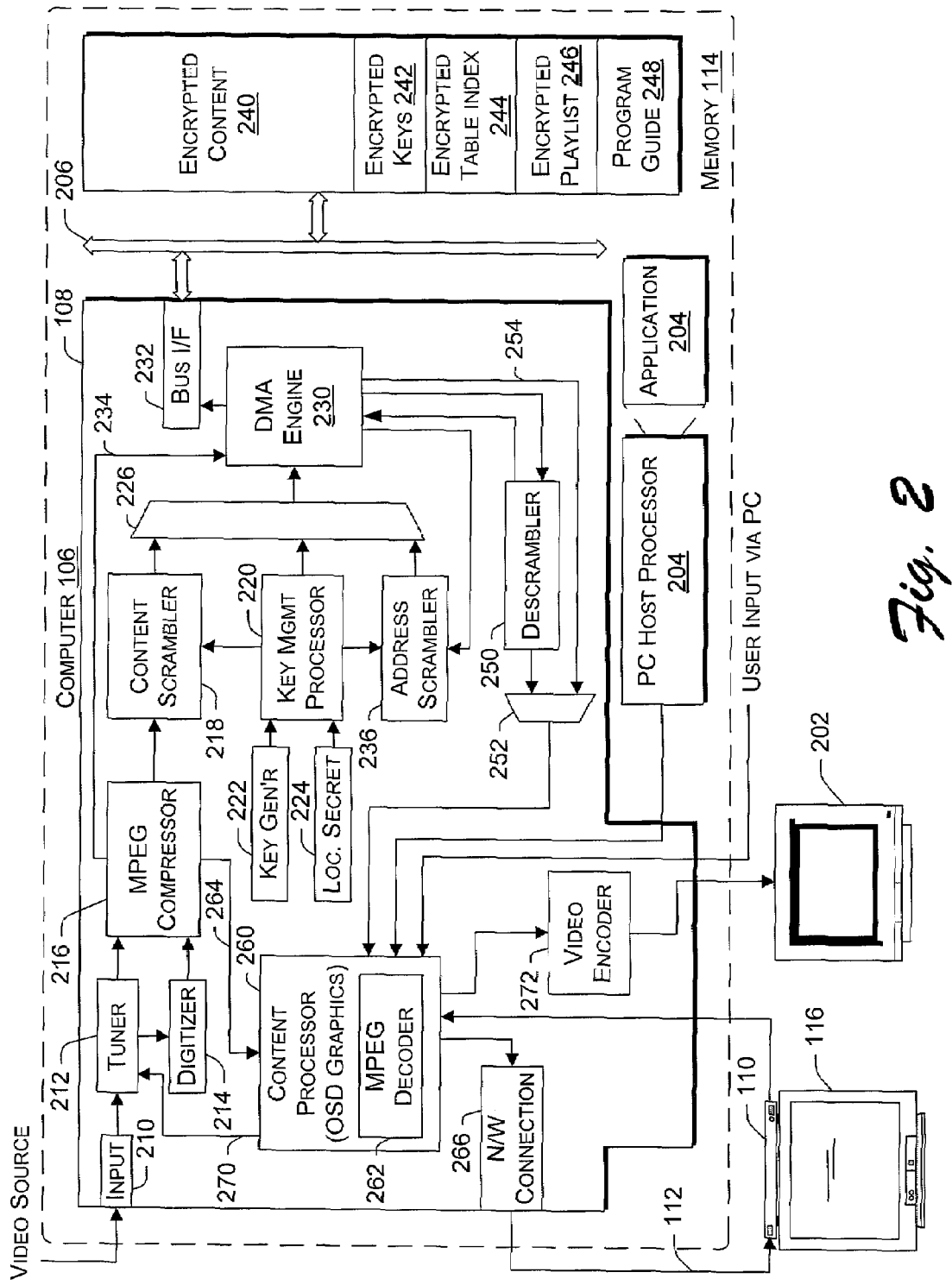
FIG. 2 is a block diagram of the PC-based personal video recorder system.

FIG. 2 shows an exemplary implementation of the PC-based PVR system 102. It includes the general-purpose computer 106, the network 112, and the set-top box 110. A television 116 (or other type of display) is coupled to the set-top box 110. The computer 106 may or may not include a monitor 202.

The computer 106 is equipped with the PVR card 108, the memory 114, a host processor 204, and a bus architecture 206 to interconnect these components. The memory 114 may be composed of many different types of memory, including volatile and non-volatile memory. It might further include removable forms of memory, such as tape or writable video disks, which can be used for archival purposes.

The bus architecture 206 may be implemented in many ways, including as a memory bus or memory controller, a peripheral bus, an accelerated graphics port, and a processor or local bus. One bus structure employed in the bus architecture is the PCI (Peripheral Component Interconnects) bus, but other bus types may be used.

The PVR card 108 includes an input 210 to connect to a receiver that receives video content from one or more video sources. One or more tuners 212 tune the receivers to particular channels or frequencies carrying the video content. When received, the content may be in analog or digital format. If the content is analog, a digitizer 214 converts the analog content to a digital stream for internal processing.

Digital video content is passed to an MPEG compressor 216, which compresses the video content according to conventional MPEG techniques. In MPEG2, for example, the compressor 216 forms a video stream composed of I-frames ("intra-frames") and P-frames (predictive frames). I-frames are coded without reference to other frames. Moderate compression is achieved by reducing spatial redundancy, but not temporal redundancy. P-frames use one or more previous I- or P-frames for motion compensation and may be used as a reference for further prediction. Each block in a P-frame can either be predicted or intra-coded. By reducing spatial and temporal redundancy, P-frames offer increased compression compared to I-frames.

A content scrambler 218 encodes the compressed video content using conventional scrambling or encryption techniques, such as AES (Advanced Encryption Standard), DES (Data Encryption Standard), and the like. The content scrambler encrypts the compressed video content using keys provided by a key management processor 220. In one implementation, the key management processor 220 provides a different encryption key for each frame of the video content. Alternatively, a single key may be used for sets of frames or for an entire program.

A key generator 222 generates the keys. As one implementation, the key generator is a random number generator that produces strings of random numbers to be used as keys. The key management processor 220 modifies the string of bits using a local secret 224 unique to the card 108, but unknown to the computer 106. For instance, the processor 220 may combine the random string of bits with the local secret using a hashing algorithm, or it may process the string of bits as some function of the local secret.

The scrambled compressed content is passed through a multiplexer 226 to a direct memory access (DMA) engine 230. The keys used to scramble the content are also encrypted (by the content scrambler 218 or the processor 220) and passed to the DMA engine 230 via multiplexer 226. In this manner, the keys are not exported off the card 108 in raw form. The DMA engine 230 determines where to store the encrypted content and keys on the memory 114.

The DMA engine 230 selects one or more addresses in the memory 114 for storage of the encrypted video content and associated keys. The DMA engine 230 outputs the encrypted video content and associated keys to bus 206 via a bus interface 232 and directs the computer to write the encrypted video content and associated keys to designated addresses in the memory 114. A software application 233 executing on the computer performs the disk transfers at the request of the PVR card.

The DMA engine 230 receives an indexing signal via line 234 from MPEG compressor 216 to identify individual frames so that the engine can index to a next address in the memory 114. The memory addresses are sent from the DMA engine 230 to an address scrambler 236, which encrypts the addresses using another set of keys provided by key management processor 220. The address scrambler 236 may employ the same or a different encryption scheme as is used by the content scrambler 218. Although shown separately, the address scrambler 236 and the content scrambler 218 may alternatively be implemented as a single integrated unit. The encrypted addresses and their associated keys (in encrypted form) are returned to the DMA engine 230, via multiplexer 226, for storage on the memory 114.

The memory 114 stores the encrypted video content 240, the encrypted version of the keys 242 used to encrypt the content and the addresses, and a table index of encrypted addresses 244. The memory may further store a playlist 246 that identifies the recorded programs stored in memory 114, and data for an electronic program guide (EPG) 248 for upcoming programming to be broadcast at a later time. Since the playlist 246 identifies existing recorded content, it is also stored in encrypted form. The EPG 248 can be stored in its original form, without scrambling.

The PVR card 108 is further equipped with a descrambler 250 that is used to unscramble or decrypt the content 240, keys 242, addresses 244, and/or playlist 246 when retrieved for playback. The decrypted data is passed to a multiplexer 252. Unencrypted data, such as EPG 248, is output from DMA engine 240 over line 254 to multiplexer 252, thereby bypassing the descrambler 250. The multiplexer 252 feeds the video content to a content processor 260.

The content processor 260 is responsible for preparing the content for display. It includes onscreen display (OSD) graphics capabilities to generate graphics, as well as an MPEG decoder 262 to decode the video content. In addition to receiving the playback content retrieved from the memory 114 and decrypted by descrambler 250, the content processor 260 receives current streaming content via line 264 from MPEG compressor 216.

Accordingly, when the viewer wishes to see a playlist of the recorded programs, the DMA engine 230 retrieves the encrypted playlist 246 by requesting the application 233 to read the playlist from the memory 114. The playlist is decrypted by descrambler 250 and passed to the content processor 260. The playlist may then be shown on the television 116 or monitor 202. From the playlist, the user may select a recorded program for playback. In response to the viewer request for a particular program, the DMA engine 230 retrieves the table index 244 of encrypted addresses, decrypts the addresses, and uses the addresses to locate the encrypted content 240 and associated keys 242. The keys are passed to the descrambler 250, where they are decrypted, and then used to decrypt the video content 240 of the requested program. The decrypted video content is passed to the content processor 260 for further processing.

The content processor 260 sends the video content via a network connection 266 and the network 112 to the decoder box 110 for display on television 116. The network 112 affords a secure pipeline to protect content flowing between the computer 106 and decoder box 110. There is a trusted relationship between the computer 106 and set-top box 110. The played back content output to the set-top box 110 is restored to the form that it was in prior to being recorded by the computer 106. It may still be in some scrambled form as imposed by the broadcasters or cable operators, and hence, the content may be further decoded by the set-top box 110 prior to display on the television 116.

The content processor 260 receives input from a user via instructions entered by the user through the decoder box 110 (e.g., using a remote control to choose a channel) or via instructions entered by the user when operating the computer 106. The processor 260 has a control line 270 connected to control the tuner 212 to tune to particular channels requested by the user.

The content processor 260 may further display data on the PC monitor 202. For instance, the user may wish to view the playlist or EPG on the computer monitor, rather than the television. Such data is output to a video encoder 272 for display on the monitor 202.

Blind Storage

Figure 3:
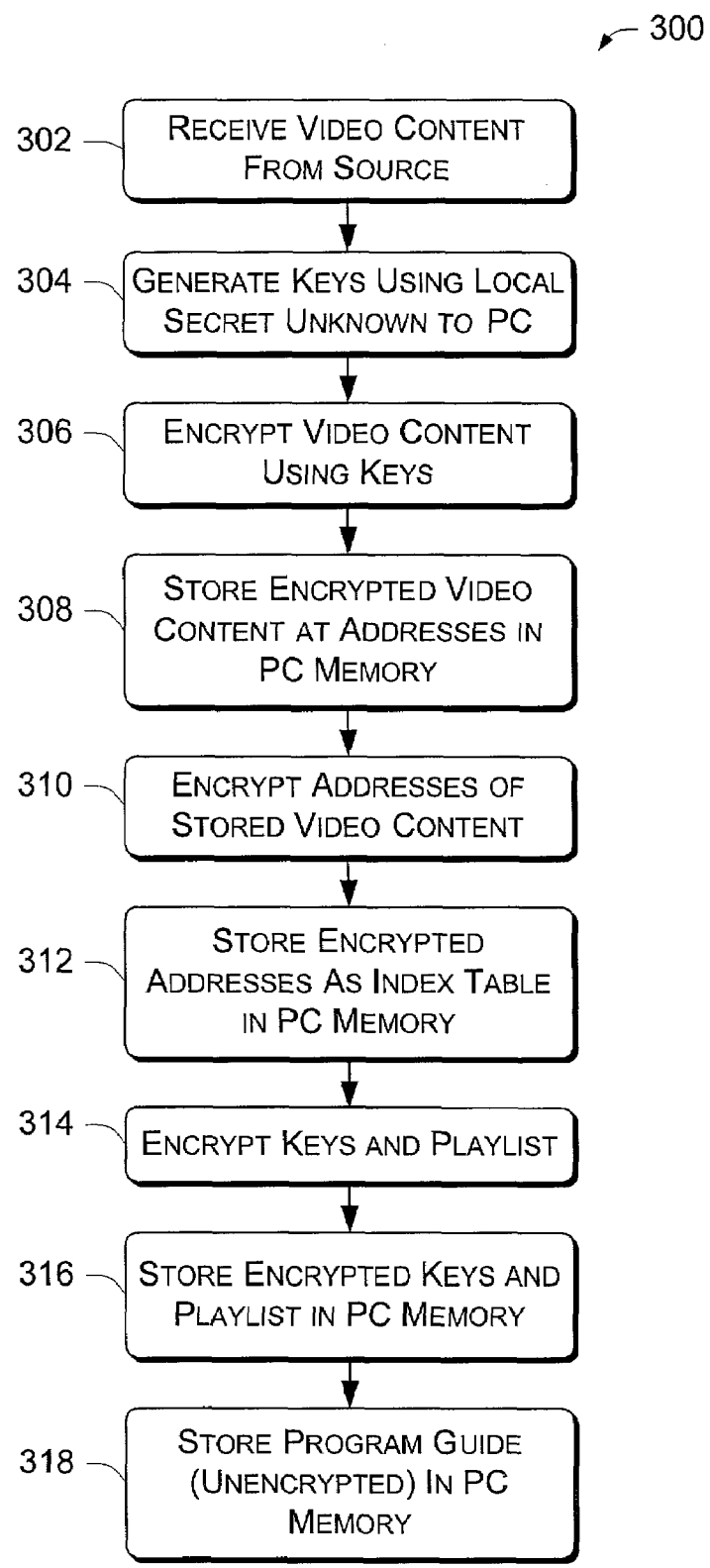
FIG. 3 is a flow diagram of an exemplary process for blindly storing content on the PC-based personal video recorder system.

FIG. 3 shows an exemplary process 300 for blindly storing video content on the PC-based personal video recorder system. The process will be described with reference to the implementation of the PVR system 102 described in FIGS. 1 and 2. The process 300 is implemented by a combination of software, firmware, and hardware. In the case of software and firmware, process 300 represents a set of operations that may be implemented as computer-executable instructions that can be executed by one or more processors.

At block 302, the system 102 receives video content from a source, such as satellite broadcaster 120, regional broadcaster 122, and cable headend 124. Tuner 212 tunes the receiver(s) to a particular channel or frequency, and the video content is received at input 210. If in analog form, the content is digitized by digitizer 214 and then passed to MPEG compressor 216 to create a stream of frames for encryption.

At block 304, the key management processor 220 creates keys used in encrypting the video content. The keys are derived from random bit strings generated by key generator 222 and a local secret 224 that is unknown to the computer 106. At block 306, the scrambler 218 encrypts the video content using the keys. If the video stream is encoded using MPEG standards, the scrambler 218 can encrypt individual frames, each with a different key. Alternatively, the scrambler may use the same key for a set of frames (e.g., one I-frame and all dependent P-frames).

At block 308, the encrypted content 240 is stored in memory 114 at addresses specified by the DMA engine 230. At block 310, the addresses themselves are encrypted. The DMA engine 230 passes the addresses to the address scrambler 236, where they are scrambled using the same or different encryption algorithm employed to encrypt the content. At block 312, the encrypted addresses are stored as an index table 244 in the memory 114.

At block 314, the keys used to encrypt the content and addresses are encrypted, as well as a playlist identifying the recorded programs stored by the PVR system 102. At block 316, the encrypted keys 242 and encrypted playlist 246 are stored in memory 114. At block 318, any program guide data 248 is stored in plaintext, without encryption, in memory 114.

In addition to be stored on disk memory, the viewer may wish to archive certain content. In this case, the content, keys, addresses, and a sub-list of the playlist can be stored on removable storage media, such as a digital video disk, tape cassette, or the like.

Playback

Figure 4:
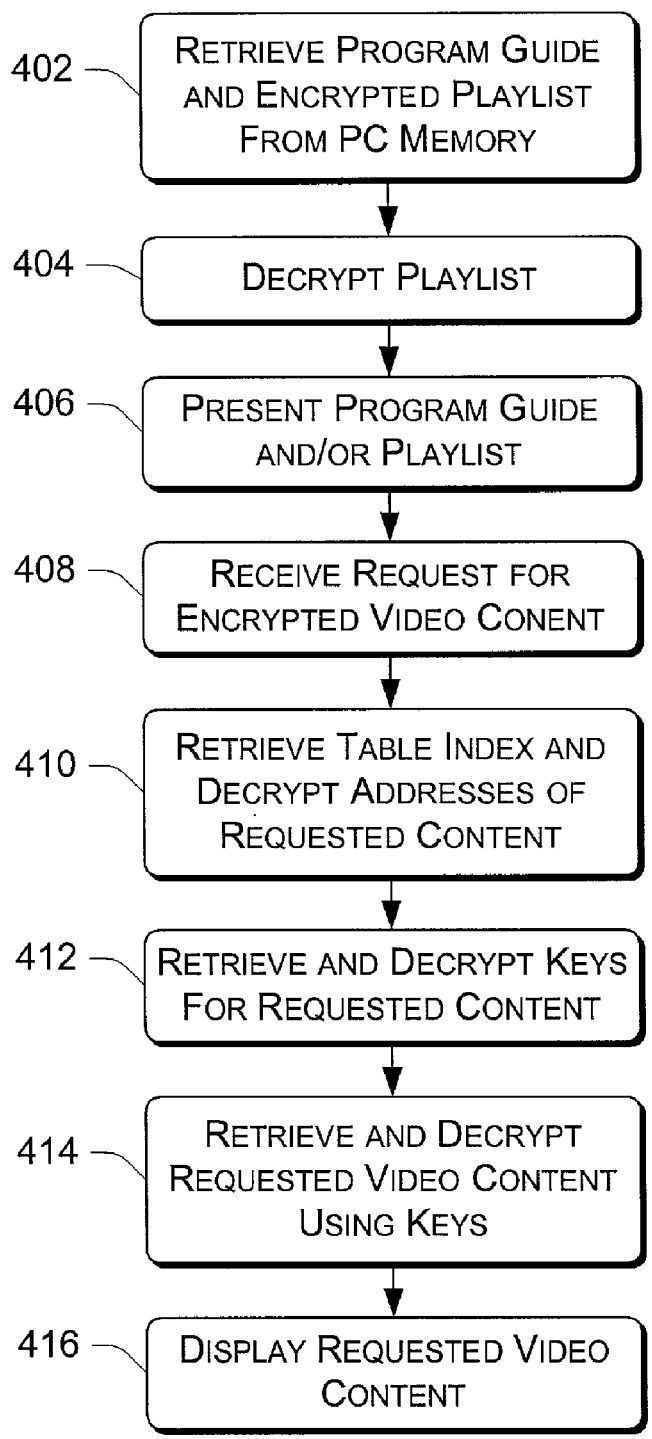
FIG. 4 is a flow diagram of an exemplary process for playing back content stored on the PC-based personal video recorder system.

FIG. 4 shows an exemplary process 400 for playing back video content stored on the PC-based personal video recorder system. The process will be described with reference to the implementation of the PVR system 102 described in FIGS. 1 and 2. The process 400 is implemented by a combination of software, firmware, and hardware.

For discussion purposes, suppose the system has stored multiple programs that may be of interest to the viewer. To see what's playing, the viewer may wish to see the playlist of recorded shows and/or the EPG of current or upcoming programs. The viewer interacts with the PVR system 102, sending instructions to view the playlist, EPG data and/or a selected program, by using input devices for the PC (e.g., keyboard, mouse, etc.) and/or for the set-top box 110 (e.g., remote control handset).

At block 402, in response to a viewer request, the system 102 retrieves the program guide 248 and/or encrypted playlist 246 from the memory 114. The EPG data 248 is passed to the DMA engine 230 and sent over line 254 to the content processor 260. The encrypted playlist 246 is passed via the 230 and sent to descrambler 250. At block 404, the descrambler 250 decrypts the playlist.

At block 406, the program guide and/or playlist are presented to the viewer. This may be done by displaying the guide and/or playlist on the PC monitor 202 or transmitting them over the network 112 to the set-top box 110, where they are displayed on television 116. Once displayed, the viewer may select a program to watch. The viewer can choose a program from the EPG that is currently being broadcast, and the PVR system will play that content as it is received from the source. Alternatively, the viewer can select a stored program.

When the PVR system receives a viewer selection of a stored program (block 408), the DMA engine 230 retrieves the table index 244 from the memory, along with certain encrypted keys 242 that were used to encrypt the addresses in the index. The descrambler 250 unscrambles the keys and uses them to decrypt the addresses in the table index (block 410). The descrambler 250 passes the addresses back to the DMA engine 230 to access the requested content and the associated keys used to encrypt the content.

At block 412, the DMA engine 230 retrieves the encrypted keys 242 associated with the requested content and passes them to the descrambler 250 for decryption. At block 414, the DMA engine 230 begins accessing the encrypted video content (e.g., frame by frame) and sending the encrypted video content to the descrambler 250. The descrambler 250 uses the recovered keys to decrypt individual or groups of frames, thereby restoring the video stream. The decrypted video stream is passed to the content processor 260, where it is decoded by MPEG decoder 262. The decoded stream is transmitted over network 112 to the set-top box and displayed on television 116 (block 416).

Exemplary Computer

Figure 5:
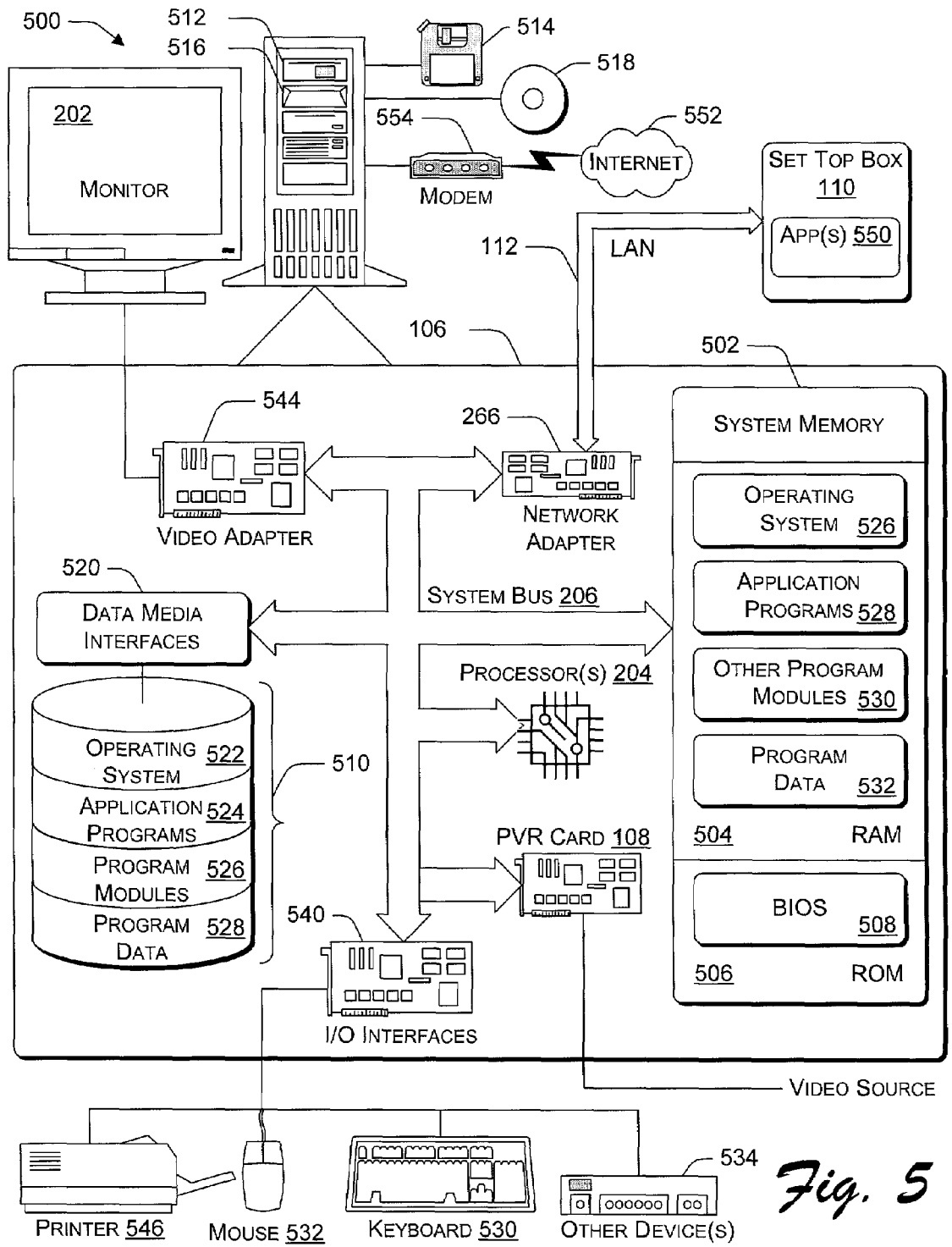
FIG. 5 is a block diagram of an exemplary general-purpose computer that may be used to implement the PC-based personal video recorder system.

FIG. 5 illustrates an example of a suitable computing environment 500 that may be used to implement the general-purpose computer 106 of the PVR system 102. Although one specific configuration is shown, the PVR system 102 may be implemented in other computing configurations.

The computing environment 500 includes a general-purpose computing device in the form of a computer 106. The components of computer 106 can include, by are not limited to, one or more host processors or processing units 204, a system memory 502, and a system bus 206. The system bus 206 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

Computer 106 typically includes a variety of computer readable media. Such media can be any available media that is accessible by the computer and includes both volatile and non-volatile media, removable and non-removable media. The system memory 502 includes computer readable media in the form of volatile memory, such as random access memory (RAM) 504, and/or non-volatile memory, such as read only memory (ROM) 506. A basic input/output system (BIOS) 508, containing the basic routines that help to transfer information between elements within computer 106, such as during start-up, is stored in ROM 506. RAM 504 typically contains data and/or program modules that are immediately accessible to and/or presently operated on by the processing unit 204.

Computer 106 may also include other removable/non-removable, volatile/non-volatile computer storage media. By way of example, FIG. 5 illustrates a hard disk drive 510 for reading from and writing to a non-removable, non-volatile magnetic media (not shown), a magnetic disk drive 512 for reading from and writing to a removable, non-volatile magnetic disk 514 (e.g., a "floppy disk"), and an optical disk drive 516 for reading from and/or writing to a removable, non-volatile optical disk 518 such as a CD-ROM, DVD-ROM, or other optical media. The hard disk drive 510, magnetic disk drive 512, and optical disk drive 516 are each connected to the system bus 206 by one or more data media interfaces 520. Alternatively, the hard disk drive 510, magnetic disk drive 512, and optical disk drive 516 can be connected to the system bus 206 by one or more interfaces (not shown).

The disk drives and their associated computer-readable media provide nonvolatile storage of computer readable instructions, data structures, program modules, and other data for computer 106. By way of example, and not limitation, computer readable media may comprise "computer storage media" (e.g., the volatile and non-volatile, removable and non-removable media described above) and "communications media", which typically embodies computer readable instructions, data structures, program modules, or other data in a modulated data signal, such as carrier wave or other transport mechanism. Communication media also includes any information delivery media. It is to be appreciated that other types of computer readable media can be utilized, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the various memories including, by way of example, an operating system 522, one or more application programs 524, other program modules 526, and program data 528. For purposes of illustration, application programs and other executable program components such as the operating system are illustrated as discrete blocks stored in memory, although it is recognized that such programs and components reside at various times in different storage components of the computing device 502, and are executed by the data processor(s) of the computer.

A user can enter commands and information into computer 106 via input devices such as a keyboard 530 and a pointing device 532 (e.g., a "mouse"). Other input devices 534 (not shown specifically) may include a microphone, joystick, game pad, satellite dish, serial port, scanner, and/or the like. These and other input devices are connected to the processing unit 204 via input/output interfaces 540 that are coupled to the system bus 206, but may be connected by other interface and bus structures, such as a parallel port, game port, or a universal serial bus (USB).

A monitor 202 or other type of display device can also be connected to the system bus 206 via an interface, such as a video adapter 544. In addition to the monitor 202, other output peripheral devices can include components such as speakers (not shown) and a printer 546 which can be connected to computer 106 via the input/output interfaces 540.

Computer 106 is networked to the set-top box 110 and/or one or more remote computers (not shown) via a local network 112 and a network interface or adapter 266. Program apps 550 may reside on the remote set top box 110, and send instructions to the computer via the network. The computer 106 may be further connected to a wide area network 552, such as the Internet, via a modem 554 or other means for establishing communications over the wide network 552. It is to be appreciated that the illustrated network connections are exemplary and that other means of establishing communication link(s) can be employed, including wireless techniques.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A personal video recorder system comprising:
   a general-purpose computer having a host processor and memory; and
   at least one video recorder card implemented in the general-purpose computer, the video recorder card in the computer being configured to tune a receiver using a tuner to a particular channel or a frequency carrying digitally streamed video content comprising of intra-frames (I-frames) and predictive frames (P-frames), receive and scramble for storage the video content and record the scrambled video content into the memory in a scrambled form that cannot be perceptibly displayed by the general-purpose computer to prevent unauthorized distribution of the video content, the video recorder card being further configured to perform steps comprising:
   retrieve and descramble the video content from the memory and output the descrambled video content for playback to a display separate from the general-purpose computer, wherein the video recorder card comprises:
      a key management processor to derive keys based on a secret value local to the video recorder card, but unknown to the general-purpose computer;
      a content scrambler to scramble the video content using the keys derived by the key management processor;
      a direct memory access (DMA) engine to direct storage of the scrambled content at specified addresses in the memory; and
      an address scrambler to scramble the specified addresses for storage on the memory; and
   store a playlist on the memory, wherein the playlist comprises a list of content stored on the memory and data for an electronic program guide comprising upcoming content to be broadcast at a later date, wherein the playlist is partially encrypted such that the list of content stored on the memory is encrypted and the data for the electronic program guide is not encrypted, wherein the content scrambler and the address scrambler are implemented as a single unit that employs a same encryption algorithm.

2. A personal video recorder system as recited in claim 1, wherein the memory comprises a hard disk drive.

3. A personal video recorder system as recited in claim 1 wherein the video recorder card is further configured to handle non-video forms of content.

4. A personal video recorder system as recited in claim 1, wherein the memory comprises removable media that can be used to archive the video content.

5. A personal video recorder system as recited in claim 1, wherein the host processor executes an application to perform transfers to and from the memory under direction of the video recorder card.

6. A personal video recorder system as recited in claim 1, wherein the video recorder card comprises a content scrambler to scramble the video content prior to storage on the memory, the content scrambler utilizing one or more encryption keys that are unknown to the general-purpose computer.

7. A personal video recorder system as recited in claim 1, further comprising:
   a decoder box, separate from the general-purpose computer, to decode the video content for playback on the display;
   a network to interconnect the general-purpose computer and the decoder box; and
   the video recorder card comprising a network connection to connect to the network.

8. A method comprising:
   tuning a receiver to a particular channel or frequency to receive a program using a tuner in a general-purpose computer;
   receiving content at the general-purpose computer;
   receiving a playlist at the general-purpose computer;
   compressing the content into MPEG form;
   generating keys using a secret unknown to the general-purpose computer;
   encrypting the content to prevent perceptible display on the general-purpose computer to prevent unauthorized distribution of the video content by using a first set of the keys;
   storing the encrypted content in memory of the general-purpose computer at selected memory addresses;
   encrypting the memory addresses using a second set of the keys;
   storing the encrypted memory addresses in the memory;
   encrypting the first and second sets of the keys;
   storing the encrypted first and second sets of the keys in the memory; and
   storing the playlist on the memory, wherein the playlist comprises a list of content stored on the memory of the general-purpose computer and data for an electronic program guide comprising upcoming content to be broadcast at a later date, wherein the playlist is partially encrypted such that the list of content stored on the memory is encrypted and the data for the electronic program guide is not encrypted;

the method further comprising, responsive to receiving a viewer instruction to play the content:

retrieving the encrypted first and second sets of the keys associated with the content;

decrypting the first and second sets of the keys;

retrieving the encrypted memory addresses from the memory;

decrypting the encrypted memory addresses using the second set of the keys; using the memory addresses to retrieve the encrypted content;

and decrypting the encrypted content using the first set of the keys.

* * * * *